United States Patent [19]

Senzani

[11] Patent Number: 5,145,537
[45] Date of Patent: Sep. 8, 1992

[54] PRODUCTION OF ARTIFICIAL VENEER

[75] Inventor: Giovanna Senzani, Modigliana, Italy

[73] Assignee: ALPI S.p.A., Modigliana, Italy

[21] Appl. No.: 587,798

[22] Filed: Sep. 25, 1990

[30] Foreign Application Priority Data

Sep. 29, 1989 [IT] Italy .................. 21893 A/89

[51] Int. Cl.⁵ ................. B44C 1/00; B32B 31/18
[52] U.S. Cl. .................. 156/61; 156/63; 156/82; 156/264; 144/346; 144/350; 144/358; 427/223; 427/280; 428/151
[58] Field of Search ............ 156/61, 63, 82, 264; 144/346, 350, 358; 427/223, 280; 428/151; 434/84

[56] References Cited

U.S. PATENT DOCUMENTS

| | | |
|---|---|---|
| 2,706,355 | 4/1955 | Brown .................. 428/151 |
| 4,388,133 | 6/1983 | Hirao et al. ............ 428/151 |
| 4,455,183 | 6/1984 | Suchomel ............... 156/219 |
| 4,731,145 | 3/1988 | Senzani ................ 428/151 |

FOREIGN PATENT DOCUMENTS 1288614 9/1972 United Kingdom.
1311707 3/1973 United Kingdom.

*Primary Examiner*—Robert A. Dawson
*Assistant Examiner*—David Reifsnyder
*Attorney, Agent, or Firm*—Fleit, Jacobson, Cohn, Price, Holman & Stern

[57] ABSTRACT

Method for production of artificial wood veneer, according to which sheets of natural wood, spot stained by burnings and/or coloring substances, are used to form a block of precomposed wood from which sheets of wood veneer are sliced presenting grains imitating briar veneers.

11 Claims, 3 Drawing Sheets ical briar veneers. The invention is also directed a briar veneer produced by means of the claimed method.

PRODUCTION OF ARTIFICIAL VENEER

BACKGROUND OF THE INVENTION

This invention relates to artificial wood veneering, and more particularly it concerns a method for producing artificial briar veneers. The invention is also directed a briar veneer produced by means of the claimed method.

Various methods are known for the production of artificial wood veneer whereby sheets of natural wood, obtained by rotary cutting from a log, are dyed or coloured, superimposed and glued together by compressing them in a mould to form a block of sheets in a press provided with moulds having surfaces of a suitable configuration for shaping the sheets of the block according to a predefined pattern. By dyeing and colouring the sheets of wood uniformly and suitably shaping the opposite surfaces of the moulds with a plurality of protrusions and raised parts which are intentionally variable and irregular, a block of sheets can be obtained from which individual sheets of briar veneer are subsequently cut.

In the known methods, the repeatability of the effect and of the pattern of the briar is strongly influenced by the various phases of the process, more particularly by colouring and dyeing phases of the sheets of natural wood which do not always guarantee perfect repeatability give that the degree of absorption of the colour may vary according to the type of wood and from one log to another. Therefore, even if the colouring and dyeing phases are adequately controlled, it is not always possible to guarantee perfect reproducibility of the pattern and of the briar effect which is to be produced.

An object of this invention is to provide a method for the production of sheets of artificial veneer, as an imitation of any type of briar, by means of which production can be controlled perfectly and constantly, thus guaranteeing repeatability and good reproduction of the patterns and of the briar effect in the product obtained in this way.

A further object of this invention is to provide a method for the production of briar veneer, as previously related, which, in addition to complete control of the production process, leads to a considerable improvement in the briar effect and confers greater naturalness.

SUMMARY OF THE INVENTION

According to this invention a method is therefore provided for the production of artificial briar veneer, whereby sheets of natural wood obtained by rotary cutting a log and suitably dyed in a base colour in a dye-bath are glued in a press to form a block from which sheets of the final imitation-briar veneer are cut, in which at least part of the sheets of natural wood, before being glued, undergo a phase of spot staining on at least one face and in predefined areas of the surface of the sheet; spot staining may occur for example by surface burning, so as to cause localised blackening without damaging the fibre structure of the wood. In this way, when the block of wood is subsequently cut, veneer sheets are obtained in which the briar pattern is strongly brought out by the appearance on the surface of the partially burnt portions of the sheets of natural wood which make up the same block. Spot staining may also occur in another way for example by dyeing or spraying colouring agents.

BRIEF DESCRIPTION OF THE DRAWINGS

The method for the production of artificial briar veneer according to this invention, and some possible variants, will be illustrated in greater detail hereunder with reference to the accompanying drawings in which.

DESCRIPTION OF THE INVENTION

Figure 1:
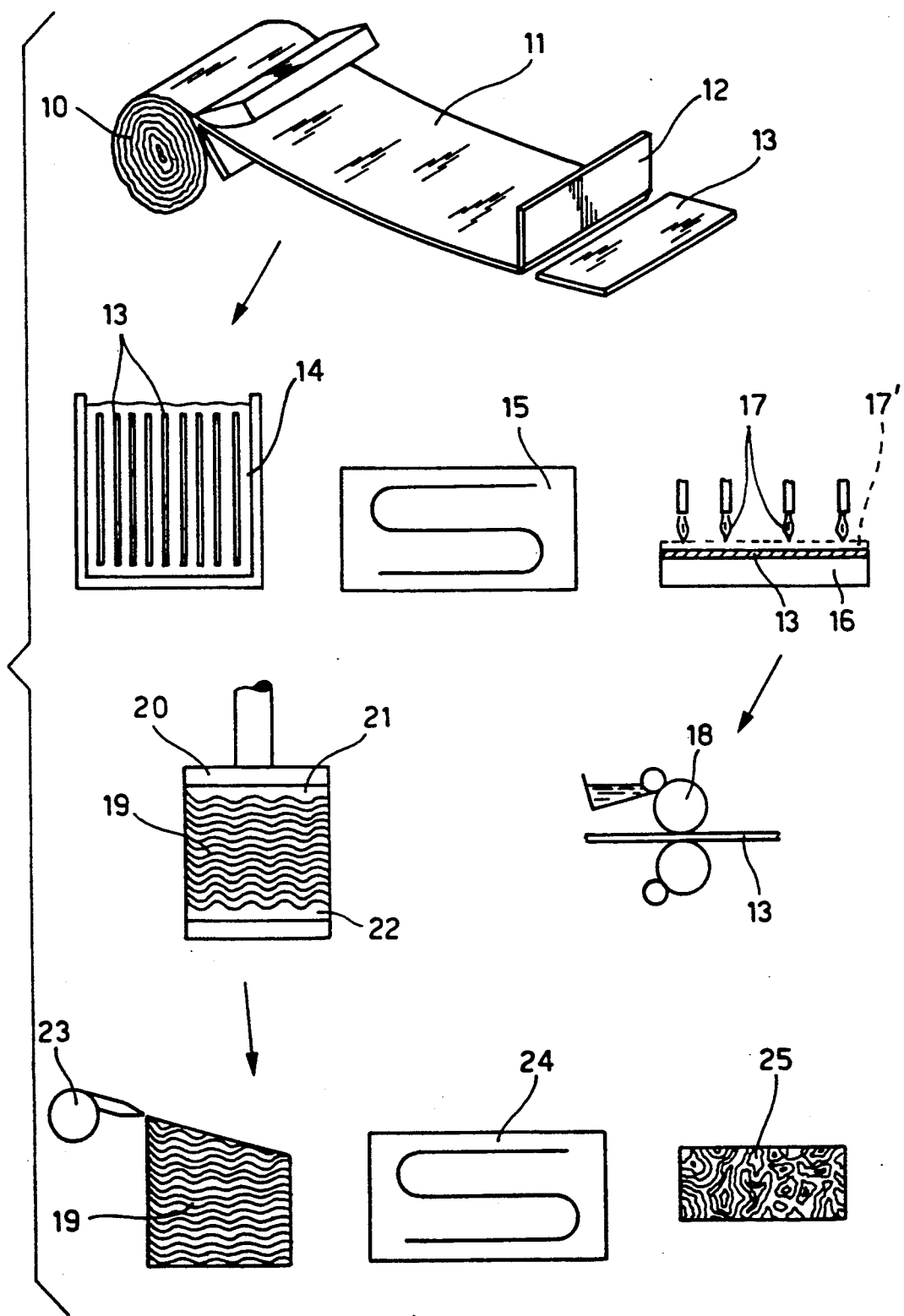
FIG. 1 shows the complete diagram of the veneer production method according to this invention.
Figure 2:
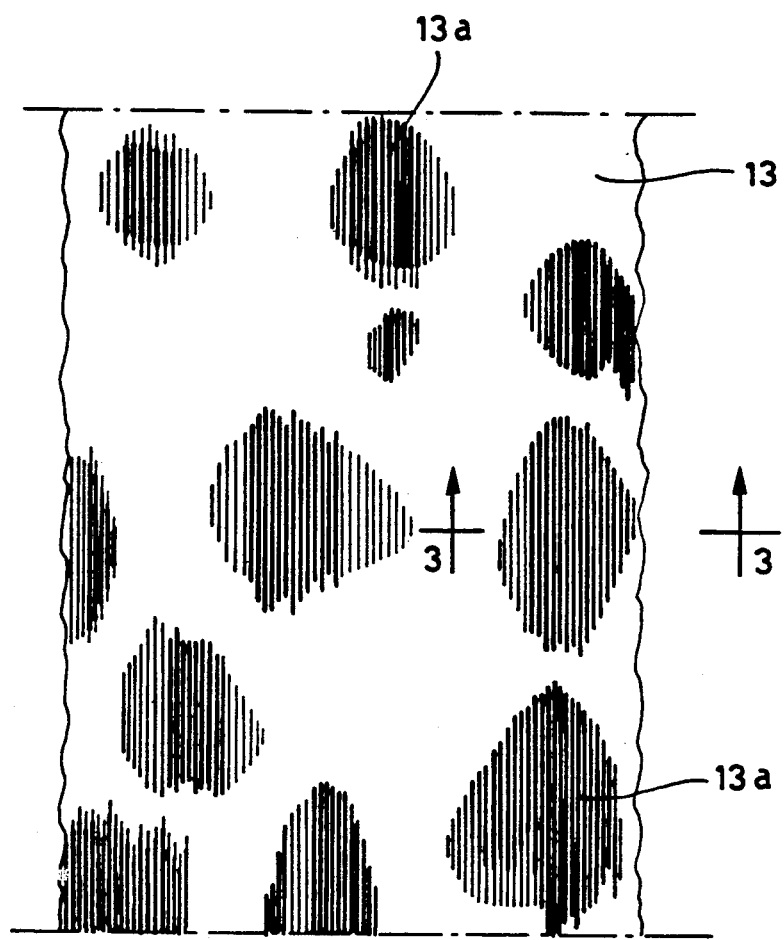
FIG. 2 shows a face of a sheet of natural wood with the characteristic spot stained areas according to the invention.

With reference to FIG. 1 we shall describe in general terms the method according to the invention for obtaining artificial briar-imitation veneer.

Reference 10 in FIG. 1 denotes a log of wood which in a known manner is rotary cut to obtain a continuous strip of wood 11 which is cut by a blade 12 to form sheets 13 of natural wood having predetermined thickness and dimensions.

The individual sheets 13 of natural wood, after cutting, are dyed or coloured for example by immersion in a dye-bath 14 for a predetermined time so that the colour can penetrate the entire thickness of the sheet or part of it.

After dyeing the sheets 13 are suitably dried in a continuous drying oven 15 and then subjected in 16 to a phase of surface spot staining by burning the same in localised and predetermined areas, on at least one face of the sheets themselves.

The surface burning of the sheets can be achieved by any suitable means, for example by means of a plurality of controlled flames 17, placing between the latter and the sheet 13 a protective stencil 17 or plate having holes or openings suitable for allowing the formation of a number of surface burns on the sheet 13 in the required shapes and positions and with the desired intensity or depth of burning.

The intensity or the depth of the burns on the sheet 13, in the individual areas, may be varied by controlling for example the time of contact with the flames 17, and in any case must be such so as not to cause damage nor cut into the fibre structure of the wood excessively.

After the phase of surface spot burning the sheets 13, these are spread on one or both sides with a glue or adhesive material, in a glueing station 18, until a block of sheets 19 is formed, of predetermined thickness, which is placed in a press 20 having moulds 21 and 22 with protrusions and raised parts suitable for deforming and shaping the sheets of the block 19 as required.

After compression, the block of wood 19 is then removed from the press 20 and transferred to a cutting station 23 where the cutting phase of the sheets is performed along a desired cutting plane. The cut sheets are dried for example in a continuous drying oven 24 to produce the final briar veneer sheets 25.

As stated previously, the spot burnt surface of the sheets 13 must take place in a controlled and repeatable manner, not only as regards shape, dimensions and position of the individual burnt areas 13a on the same side of the sheet, but also as regards the intensity and depth of each individual burn and in general of the spot stained areas. In fact, given that individual sheets of natural wood 13 may also have a relatively small thickness, for example a few thenths of a millimeter, or greater thicknesses, steps must be taken so that each individual surface burn does not penetrate deeply into the thickness of the sheet and does not appear on the opposite face. From tests carried out it has been observed that the depth of each burn must preferably be equal to or smaller than 50% of the thickness of the sheet itself. This can be achieved by controlling both the intensity and the distance of the flames 17 from the sheet 13, or more generally the temperature of the burning means and the time they are in contact with the sheets of wood. Since the effects which can be achieved on the briar pattern in the final product depend upon the intensity of the surface burning or spot staining of the sheets, each time appropriate burning or staining tests and a check of the characteristics of the wood used must be performed.

Figure 4:
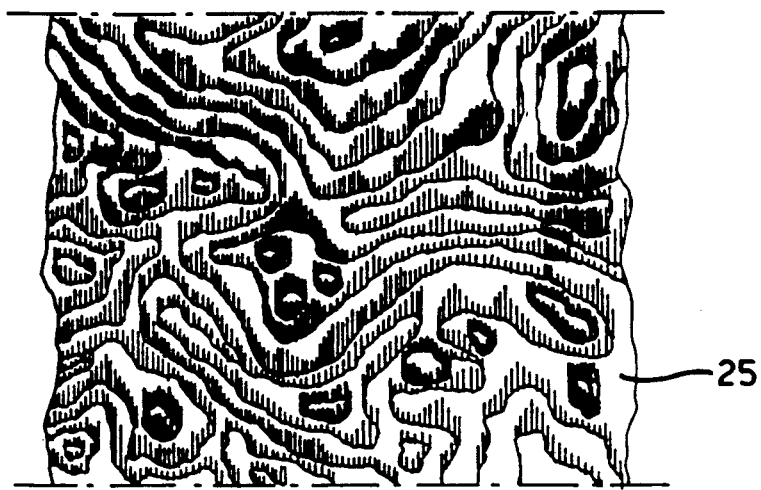
FIG. 4 shows a partial view of a briar veneer sheet, according to the invention.

FIG. 4 shows by way of an example a form of briar pattern which can be obtained by means of the method according to the invention. The parts most blakened in FIG. 4 represent the grains of the briar in correspondence of which burnt or spot stained areas 13a appear on the surface of the individual sheets 13 which make up the block 19.

Figure 3:
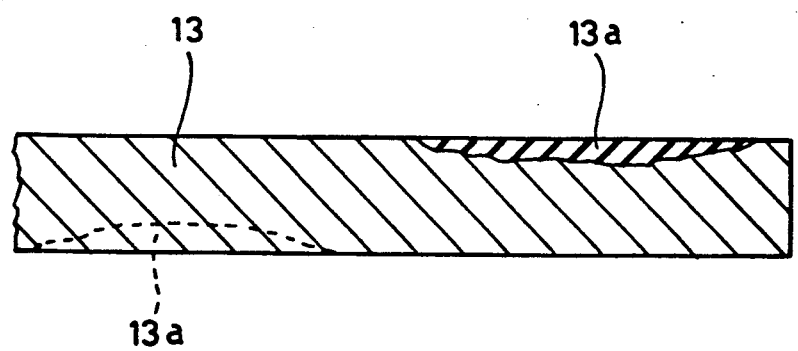
FIG. 3 is a cross section along line 3—3 of FIG. 2.

As related previously, and as shown in FIG. 3, steps must be taken so that the depth of the burn or stained spot in corrispondence of the individual areas 13a is small and less than half the thickness of the sheet, so as not to cause irreparable damage to the fibre structure; moreover the briar grain effect on the final veneer sheet 25 will depend on the depth of each burnt area 13a, as well as on its position and shape. Therefore it is preferable to produce burns 13a on a single face of each individual sheet. Nevertheless in certain cases burns can be made on both the faces of the sheet 13; in this case the burnt areas 13a on one face must be spaced apart and must not be superimposed on the burnt areas 13a on the other face of the same sheet.

Figure 5:
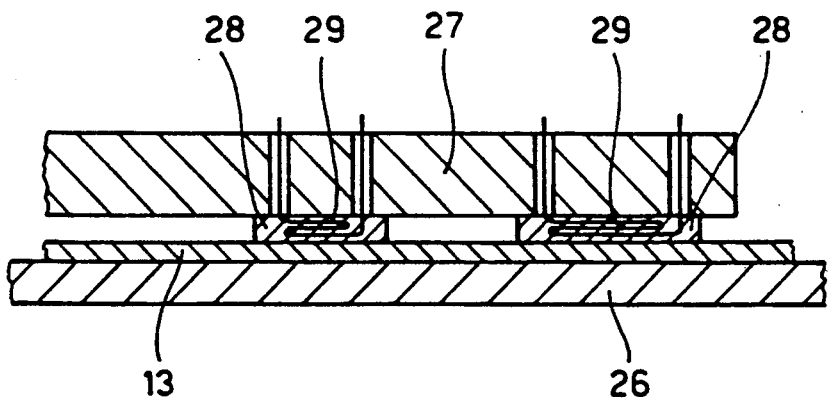
FIG. 5 shows an alternative for producing spot burns on the sheet of FIG. 2.

FIG. 5 of the accompanying drawings shows a further way in which burns are produced on one face of a sheet of natural wood 13. The sheet 13, arranged on a suitable supporting surface 26 is burnt in the areas 13a keeping it in contact with an electrically heated plate, for example comprising a metallic plate 27 having its face provided with burning elements 28 in the form of aluminium blocks, fixed for example in a removable manner, incorporating a resistor 29. The individual burning elements 28, whose shape and size are to vary as a function of the shapes and arrangement of the burnt areas 13a to be obtained on the sheets 13, are placed in contact with and pressed against the sheet 13 maintaining contact for a required length of time sufficient to cause the desired burn impressions. By suitably adjusting the temperature of the heating elements 28, for example by regulating the intensity of the current circulating in the heating resistors 29, it is possible to vary and adequately control the intensity and depth of the burns in the individual areas 13a of the sheets 13.

As part of the method according to this invention variants can be made in the formation of the block 19 and consequently in obtaining the briar pattern in the final sheet 25. For example, the block 19 can be formed by superimposing dyed sheets of natural wood and provided with burnt areas 13a. as described previously, causing the burns on one sheet to correspond or superimpose exactly with the same burns of the other sheets. It will also be possible to place burnt sheets between unburnt sheets of natural wood, or alternate sheets with burns of one type with sheets having burns of another type as regards shape, arrangement and intensity of the individual burnt areas on one or both faces, according to the final result required.

As mentioned previously, in place of the spot staining achieved by burning, colouring could be performed by spraying or applying a colouring substance in some other way, for example by sponging or by means of a specially provided roller, making sure that it penetrates only partially into the thickness of the wood, in determined areas on one or both surfaces of the sheet.

In every case the innovation consists in the use of sheets of natural wood in which their state and their base, natural or dyed colour has been changed or altered by burning, or spot staining, at least one face in the desired shape and arrangement. In this way it is possible to achieve perfect and constant control of the production process which guarantees repeatability of results and an improved, more attractive walnut effect of the veneer which confers greater natural effect to the product.

What is claimed is:

1. Method for producing briar imitating wood veneer, whereby sheets of natural wood obtained by rotary slicing a log are glued for forming a block of sheets from which veneer sheets with an imitation-brair pattern are then cut, comprising the steps of:
   preparing basic sheets of natural wood having homogeneous surface areas,
   spot staining at least one face of said basic sheets,
   forming a block by overlapping said spot stained sheets provided with an adhesive substance by exerting pressure on the block, and
   slicing final imitation-briar pattern veneer sheets from said block in a direction parallel to a predetermined cutting plane.

2. Method according to claim 1, in which said spot staining is obtained by burning.

3. Method according to claim 1, in which said spot staining is obtained by spot dyeing, sponging or spraying a colouring substance.

4. Method according to claim 1, in which said spot staining of the sheet is provided in areas having a predetermined shape and dimensions.

5. Method according to claim 2, in which the spot burning affects a thickness equal to or less than 50% of the thickness of the sheet.

6. Method according to claim 2, wherein individual sheets are provided with areas having a different intensity or depth of spot burning from other spot-burned areas on the same sheet.

7. Method according to claim 1, in which a block of sheets is formed by superimposing burnt sheets having spot stained areas which are identical in shape and size and in identical positions.

8. Method according to claim 1 in which a block of sheets is formed by alternating sheets of natural unstained wood, with sheets of wood having spot stained surface areas.

9. Method according to claim 1, in which said sheets of natural wood have spot stained areas on both faces.

10. Method according to claim 9, in which the spot stained areas on one face of a sheet are in different positions to the spot stained areas on the other face of the same sheet.

11. Method according to claim 5, wherein individual sheets are provided with areas having a different intensity or depth of spot burning from other spot-burned areas on the same sheet.

* * * * *